(12) United States Patent
Huang

(10) Patent No.: US 7,833,040 B2
(45) Date of Patent: Nov. 16, 2010

(54) CARD SOCKET ASSEMBLY

(75) Inventor: Shao-Mo Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/536,304

(22) Filed: Aug. 5, 2009

(65) Prior Publication Data

US 2010/0093235 A1    Apr. 15, 2010

(30) Foreign Application Priority Data

Oct. 13, 2008    (CN) .................. 2008 1 0304898

(51) Int. Cl.
*H01R 13/62*    (2006.01)
(52) U.S. Cl. ..................................... 439/326
(58) Field of Classification Search ............. 439/326, 439/630
See application file for complete search history.

(56) References Cited

U.S. PATENT DOCUMENTS

| 6,220,882 | B1 * | 4/2001 | Simmel et al. | 439/326 |
| 6,761,575 | B2 * | 7/2004 | Bricaud et al. | 439/326 |
| 7,666,018 | B2 * | 2/2010 | Shih | 439/326 |
| 2006/0270263 | A1 * | 11/2006 | Hirata | 439/326 |

* cited by examiner

*Primary Examiner*—Gary F. Paumen
(74) *Attorney, Agent, or Firm*—Steven M. Reiss

(57) ABSTRACT

A card socket assembly includes a body member defining a receiving cavity and a cover member. The cover member includes an elastic portion disposed at a first end thereof and abutting against the body member, and a latching portion disposed at a second end thereof opposite to the first end. The first end of the cover member is rotatably mounted to the body member. The latching portion is configured for being detachably latched to the body member. The cover member is configured for covering the receiving cavity and being capable of sliding against the elastic portion to release the latching portion from the body member.

18 Claims, 7 Drawing Sheets

CARD SOCKET ASSEMBLY

BACKGROUND

1. Technical Field

The present disclosure relates to card socket assemblies and, particularly, to a card socket assembly used in a portable electronic device, e.g., mobile phone, personal digital assistant (PDA) etc.

2. Description of Related Art

With the development of wireless technology, portable electronic devices are becoming widely used and multifunctional. A portable electronic device usually includes several data cards, e.g., a subscriber identity module (SIM) card used to store personal information and a secure digital memory (SD) card used to store audio data and video data. Thus, card socket assemblies are required for users to easily secure and remove these data cards.

A typical card socket assembly includes a card slot defined in a housing of a portable electronic device. The card socket assembly further includes a securing means used to secure a data card within the card slot.

However, to remove the data card from the card slot, a user has to apply a quite large force on the data card against a securing force of the securing means. Thus, it's easy to damage the data card and the securing means, and inconvenient for use.

Therefore, there is room for improvement within the art.

BRIEF DESCRIPTION OF THE DRAWINGS

Many aspects of the card socket assembly can be better understood with reference to the following drawings. These drawings are not necessarily drawn to scale, the emphasis instead being placed upon clearly illustrating the principles of the present card socket assembly. Moreover, in the drawings like reference numerals designate corresponding sections throughout the several views.

DETAILED DESCRIPTION

Figure 1:
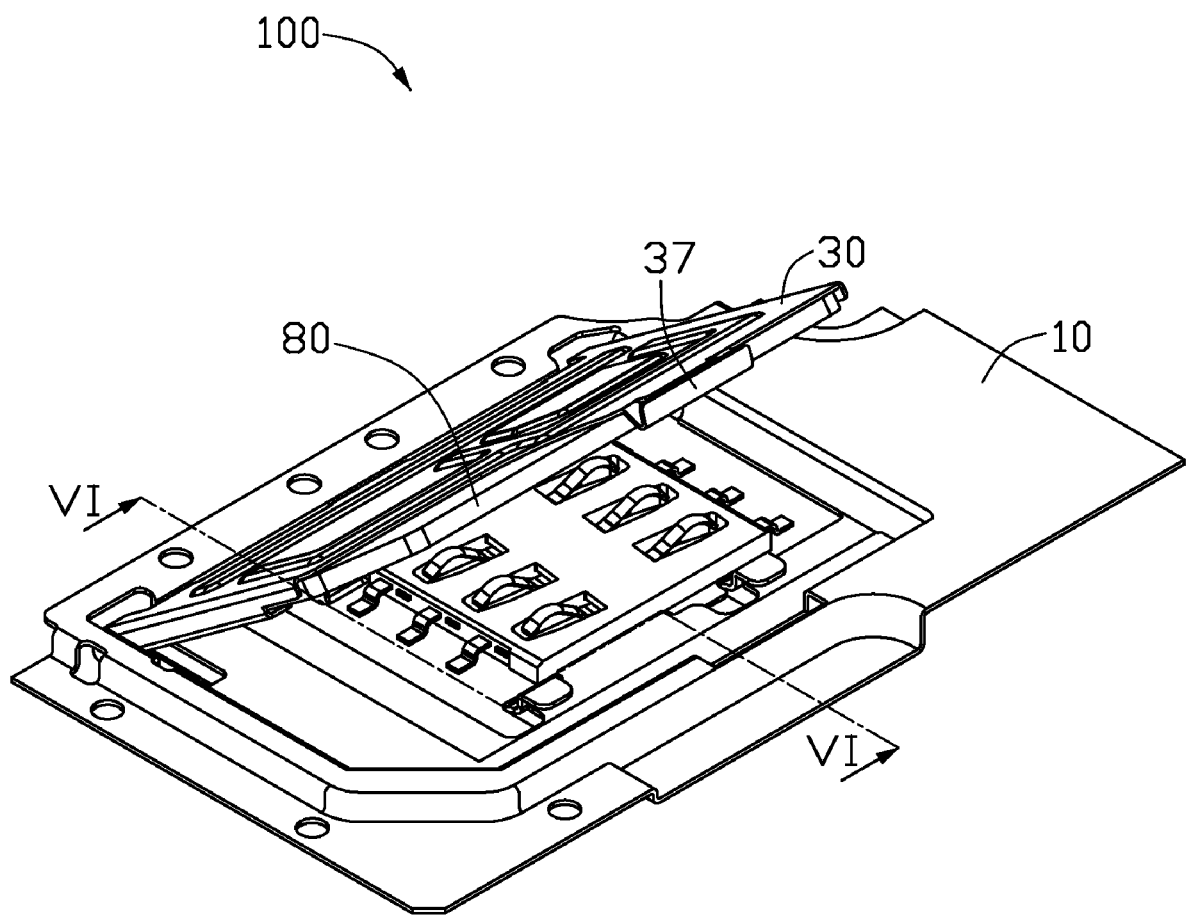
FIG. 1 is an assembled view of the card socket assembly in accordance with an exemplary embodiment, with the cover member opened.
Figure 2:
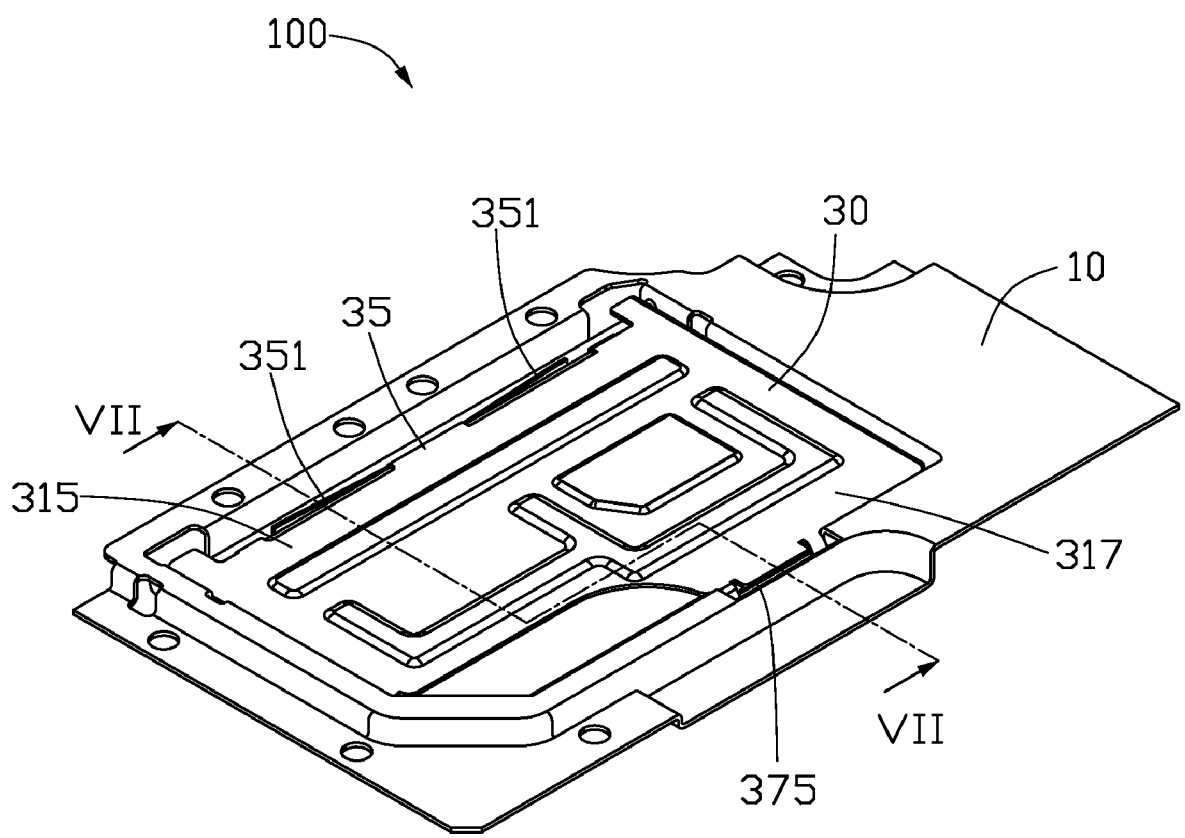
FIG. 2 is similar to FIG. 1, but the cover member is closed.

FIGS. 1 and 2 show an exemplary card socket assembly 100 used in portable electronic devices, such as mobile phone terminals, digital cameras, and others. The card socket assembly 100 is used to secure a data card 80. The card socket assembly 100 includes a body member 10, a cover member 30, and a pivoting shaft 50 (see FIG. 3). The cover member 30 is rotatably mounted to the body member 10 by the pivoting shaft 50.

Figure 3:
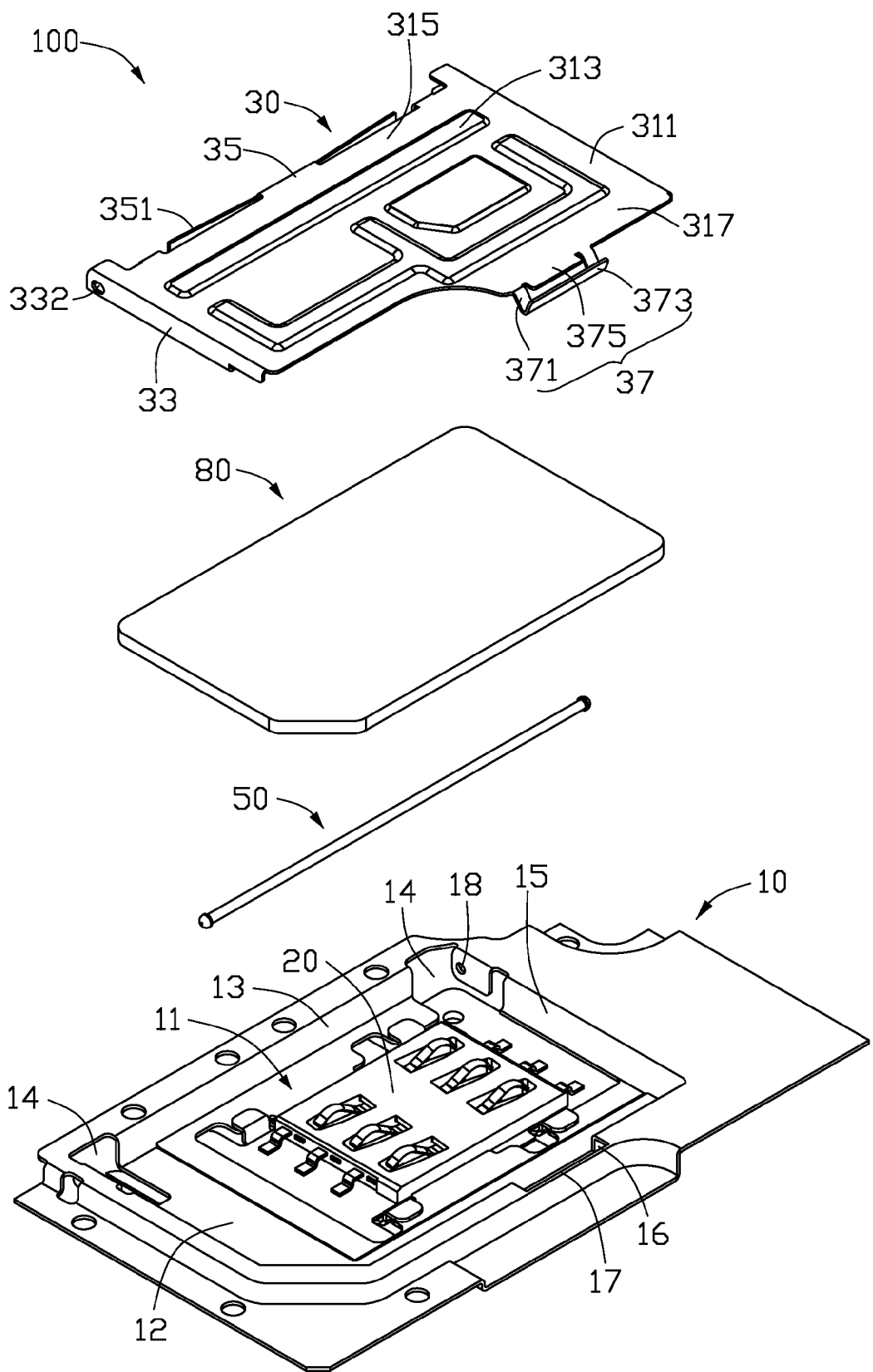
FIG. 3 is an exploded, isometric view of the card socket assembly shown in FIG. 1.
Figure 4:
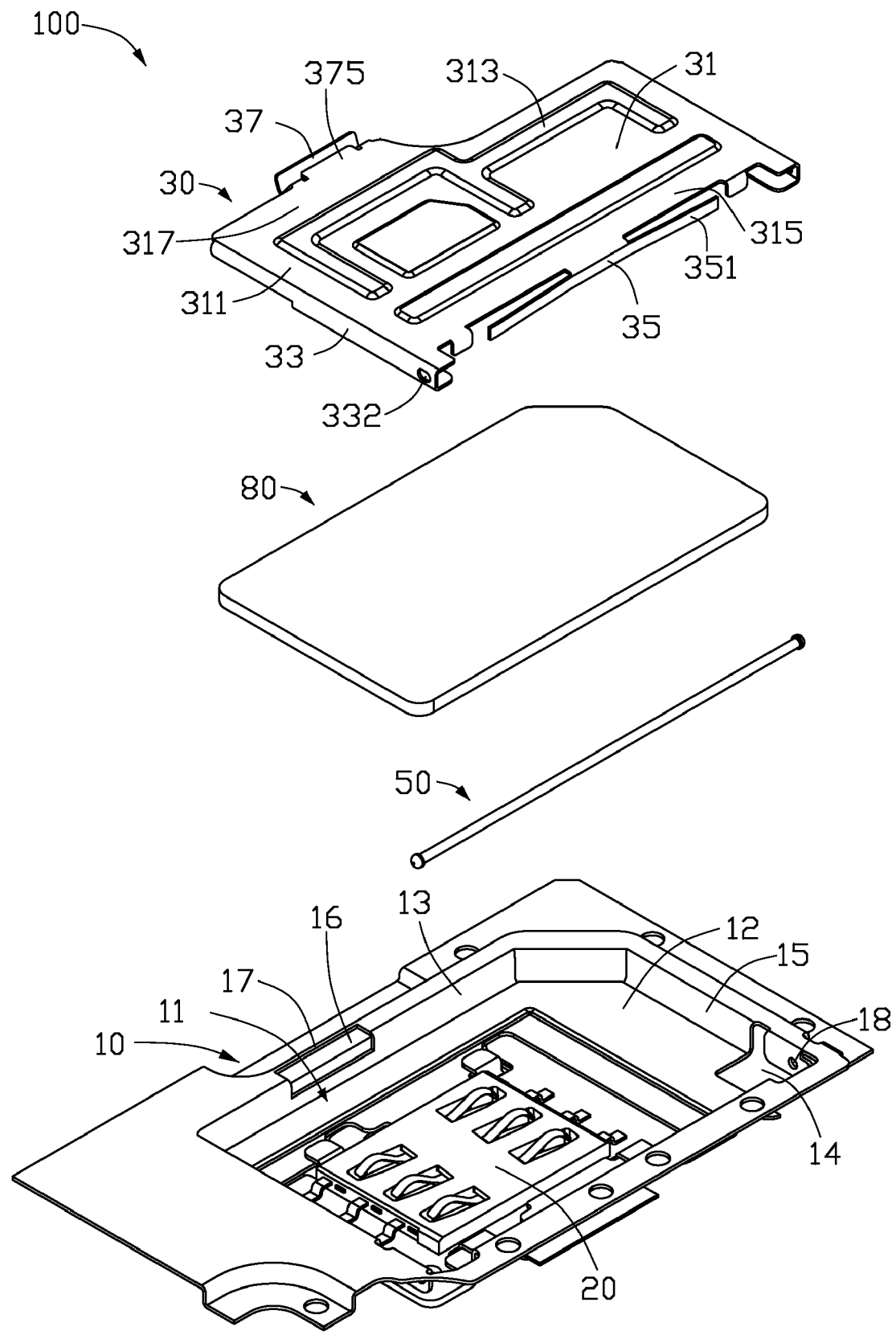
FIG. 4 is similar to FIG. 3, but viewed from another aspect.

Referring also to FIGS. 3 and 4, the body member 10 includes an inset portion to form a receiving cavity 11, used to receive the cover member 30 and the data card 80 therein. The receiving cavity 11 is enclosed by a bottom wall 12, two parallel first sidewalls 13, and two parallel second sidewalls 15 connected to both ends of the first sidewalls 13. The bottom wall 12 includes a connector 20, used to electrically contact with the data card 80. One first sidewall 13 defines two openings 14 through both ends thereof respectively. The other first sidewall 13 defines a cutout 16, thus forming a first latching wall 17. The two second sidewalls 15 respectively define two pivoting holes 18 adjacent to the corresponding opening 14. The two pivoting holes 18 are oppositely defined, and used to mount the pivoting shaft 50 therein.

Figure 5:
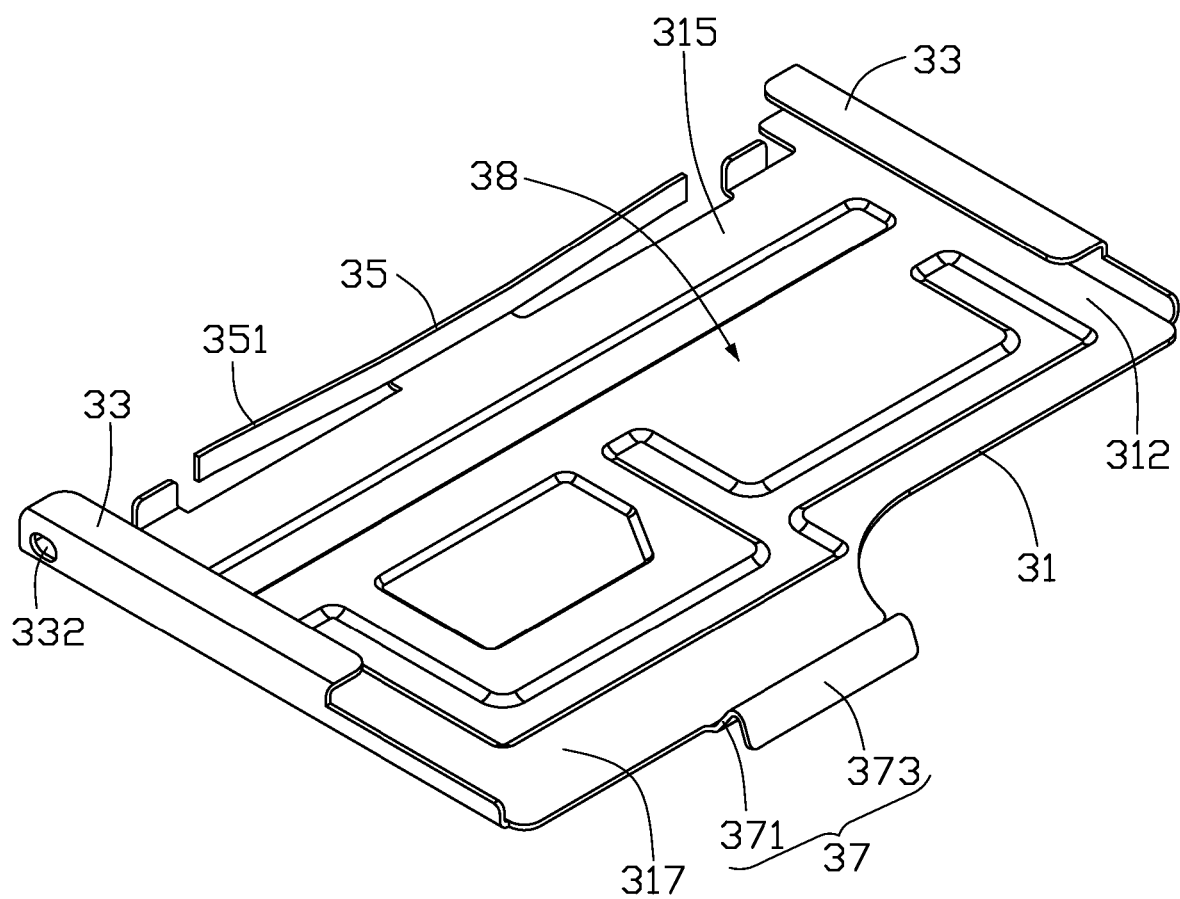
FIG. 5 is an isometric view of the cover member shown in FIG. 1.

Referring to FIG. 5, the cover member 30 is rotatably and detachably mounted to the body member 10 by the pivoting shaft 50. The cover member 30 includes a top wall 31, two clamping walls 33, an elastic portion 35, and a latching portion 37. The top wall 31 includes an exterior surface 311, an interior surface 312 opposite to the exterior surface 311, a pivoting end 315, and a latching end 317 opposite to the pivoting end 315. The exterior surface 311 includes a plurality of protrusions 313 protruding therefrom to strengthen the top wall 31. The two clamping walls 33 are generally L-shaped sheets, and formed by bending both opposite ends of the top wall 31 towards the interior surface 312. The two clamping walls 33 respectively define a mounting hole 332, adjacent to the pivoting end 315. The two mounting holes 332 are oppositely defined, and used to mount the pivoting shaft 315 therein. Each mounting hole 332 is an elongated hole having a predetermined width, thus the pivoting shaft 315 can slide along the width of the mounting hole 332 longitudinally.

The elastic portion 35 is disposed at the pivoting end 315. The elastic portion 35 is an arced sheet spring, formed by bending the pivoting end 315 towards the interior surface 312. The elastic portion 35 is located between the two latching walls 33. Both ends of the elastic portion 35 are free ends 351 not connected to the top wall 31. The elastic portion 35, the top wall 31, and the two clamping walls 33 cooperatively enclose a card slot 38, used to receive the data card 80 therein. The latching portion 37 is a generally V-shaped sheet, disposed at the latching end 317 corresponding to the first latching wall 17 of the body member 10. The latching portion 37 includes a connecting wall 371 and a second latching wall 373. The connecting wall 371 is bent towards the interior surface 312. The second latching wall 373 is linked to the latching end 317 by the connecting wall 371. The second latching wall 373 is bent towards the exterior surface 311. The top wall 311 further includes an operating portion 375, used to facilitate rotating the cover member 30 relative to the body member 10.

Referring back to FIGS. 1 and 2 together, in assembly, the cover member 30 is placed over the body member 10, and inserted into the receiving cavity 11. At this time, the free ends 351 of the cover member 35 abut against the first sidewall 13 of the body member 10. The latching portion 37 of the cover member 30 is inserted into the cutout 16 of the body member 10, and the second latching wall 373 latches to the first latching wall 17. Then the pivoting shaft 50 is inserted into the pivoting holes 18 and the mounting holes 332, thus rotatably mounting the cover member 30 to the body member 30.

Figure 6:
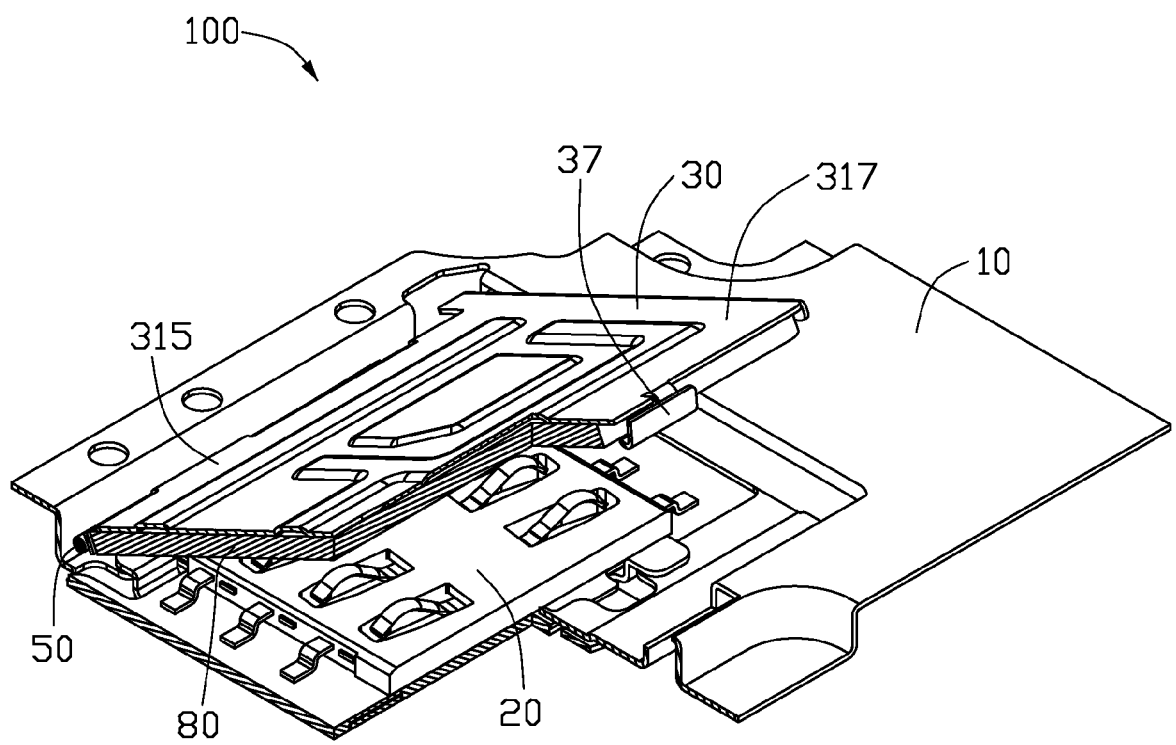
FIG. 6 is a cross-sectional view of the card socket assembly taken along line VI-VI.
Figure 7:
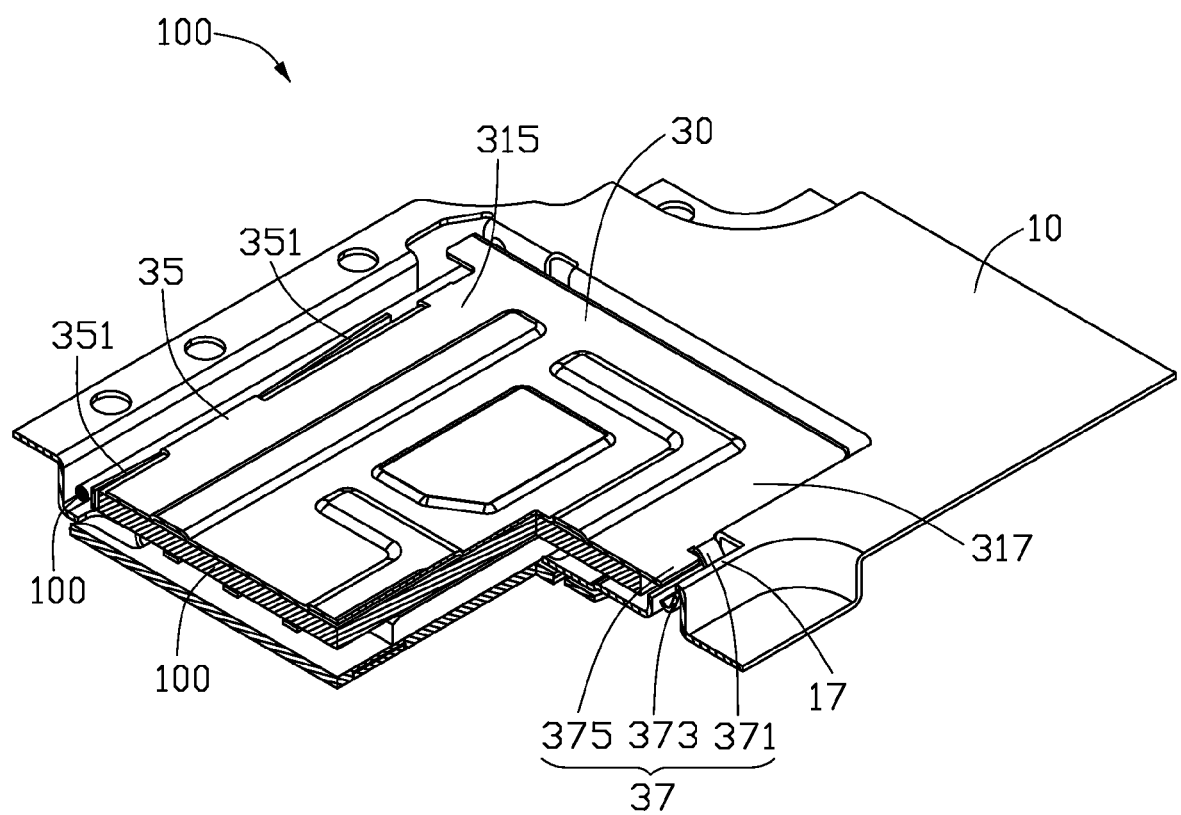
FIG. 7 is another cross-sectional view of the card socket assembly taken along line VII-VII.

Referring to FIGS. 6 and 7, to insert the data card 80 into the receiving cavity 11, the cover member 30 is rotated away from the body member 10 around the pivoting shaft 50 until fully open. Then the data card 80 is inserted into the card slot 38. The cover member 30 is then rotated towards the body member 10 around the pivoting shaft 50 until the second latching wall 373 latches to the first latching wall 17. To release the data card 80 out of the receiving cavity 11, the cover member 30 is pushed towards the openings 14 of the body member 10. At this time, the cover member 30 slides towards the openings 14 against the free ends 351 of the elastic portion 35 by pivoting shaft 315 sliding along the width of the mounting hole 332 until the second latching wall 373 departs from the first latching wall 17. Thus, a user can rotate the cover member 30 away from the body member 10 to take out the data card 80.

In other embodiments, the two clamping walls 33 can be omitted, that is, the data card 80 can be directly received in the receiving cavity 11, and the cover member 30 is used to press the data card 80 in the receiving cavity 11.

The card socket assembly 100 is simple in configuration, and users can easily secure the data card 80 in the receiving cavity 11 and remove the data card 80 out of the receiving cavity 11 via an easy rotating operation of the cover member 30 relative to the body member 10.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A card socket assembly comprising:
   a body member defining a receiving cavity; and
   a cover member including an elastic portion disposed at a first end thereof and abutting against the body member, and a latching portion disposed at a second end thereof opposite to the first end, the first end of the cover member being rotatably mounted to the body member, the latching portion configured for being detachably latched to the body member, the cover member configured for covering the receiving cavity and being capable of sliding against the elastic portion to release the latching portion from the body member.

2. The card socket assembly as claimed in claim 1, wherein the cover member includes a top wall, the first end is a pivoting end, the elastic portion is an arced sheet spring, formed by bending the pivoting end towards an interior surface of the top wall.

3. The card socket assembly as claimed in claim 1, wherein the receiving cavity is enclosed by a bottom wall, two parallel first sidewalls, and two parallel second sidewalls connected to both ends of the first sidewalls, one first sidewall defines two openings through both ends thereof, the other first sidewall defines a cutout, forming a first latching wall.

4. The card socket assembly as claimed in claim 3, wherein the bottom wall includes a connector, used to electrically contact with a data card received in the receiving cavity.

5. The card socket assembly as claimed in claim 3, further comprising a pivoting shaft, wherein the two second sidewalls respectively each defines an elongated pivoting hole adjacent to the corresponding openings, the two pivoting holes are oppositely defined, and used to slidably and rotatably mount the pivoting shaft therein, thus rotatably and slidably mounting the cover member to the body member.

6. The card socket assembly as claimed in claim 2, wherein the cover member further includes two clamping walls formed by bending both sides of the top wall, the two clamping walls and the top wall cooperatively enclose a card slot, the card slot receives a data card therein.

7. The card socket assembly as claimed in claim 5, wherein the cover member further includes two clamping walls formed by bending both sides of the top wall, the clamping walls respectively define a mounting hole, the two mounting holes are oppositely disposed, used to mount the pivoting shaft therein, thus rotatably mounting the cover member to the body member.

8. The card socket assembly as claimed in claim 1, wherein the cover member further includes two clamping walls formed by bending both sides of the top wall, the elastic portion is located between the two clamping walls, both ends of the elastic portion are free ends.

9. The card socket assembly as claimed in claim 3, wherein the latching portion includes a connecting wall and a second latching wall, the connecting wall is bent towards an interior surface of the top wall, the second latching wall is linked to the latching end by the connecting wall, the second latching wall is bent towards the exterior surface, the second latching wall is latched to the first latching wall.

10. The card socket assembly as claimed in claim 1, wherein the top wall further includes an operating portion, used to facilitate rotating operation of the cover member relative to the body member.

11. The card socket assembly as claimed in claim 1, wherein the top wall further includes a plurality of protrusions protruding from an exterior surface to strengthen the intention of the top wall.

12. A card socket assembly comprising:
    a body member defining a receiving cavity; and
    a cover member including a first end and an opposite second end, the first end being rotatably mounted to the body member, the second end being detachably latched to the body member, the cover member further including an elastic portion extending from a first end thereof, the elastic portion being configured for abutting between the first end and the body member such that the second end of the cover member stably latch to the body member and the cover member is capable of sliding against the elastic portion to detach the second end from the body member.

13. The card socket assembly as claimed in claim 12, wherein the cover member includes a top wall, the first end is a pivoting end, the elastic portion is an arced sheet spring, formed by bending the pivoting end towards an interior surface of the top wall.

14. The card socket assembly as claimed in claim 12, wherein the receiving cavity is enclosed by a bottom wall, two parallel first sidewalls, and two parallel second sidewalls connected to both ends of the first sidewalls, one first sidewall defines two openings through both ends thereof, the other first sidewall defines a cutout, forming a first latching wall.

15. The card socket assembly as claimed in claim 14, wherein the bottom wall includes a connector, used to electrically contact with a data card received in the receiving cavity.

16. The card socket assembly as claimed in claim 14, further comprising a pivoting shaft, wherein the two second sidewalls each defines an elongated pivoting hole adjacent to the corresponding openings, the two pivoting holes are oppositely defined, and used to slidably and rotatably mount the pivoting shaft therein, thus rotatably and slidably mounting the cover member to the body member.

17. The card socket assembly as claimed in claim 13, wherein the cover member further includes two clamping walls formed by bending both sides of the top wall, the two clamping walls and the top wall cooperatively enclose a card slot, the card slot receives a data card therein.

18. The card socket assembly as claimed in claim 12, wherein the cover member further includes two clamping walls formed by bending both sides of the top wall, the elastic portion is located between the two clamping walls, both ends of the elastic portion are free ends.

* * * * *